Oct. 28, 1930.  L. DUNKELSBERG  1,779,533
SPECTACLES
Filed Nov. 20, 1924
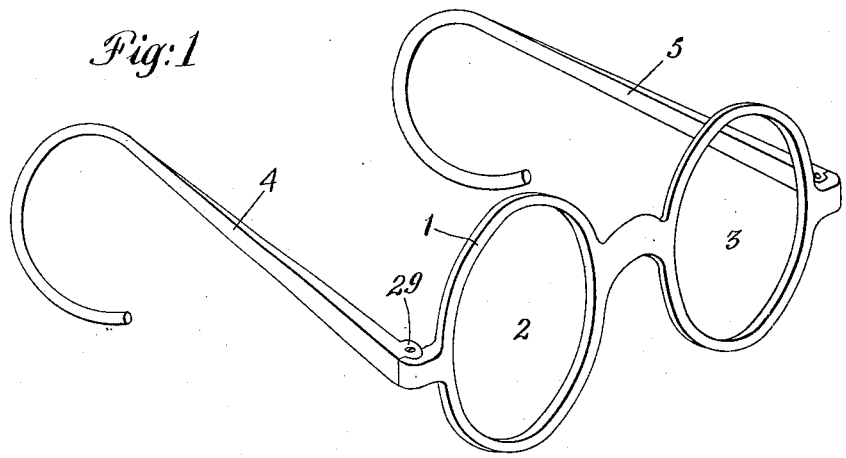
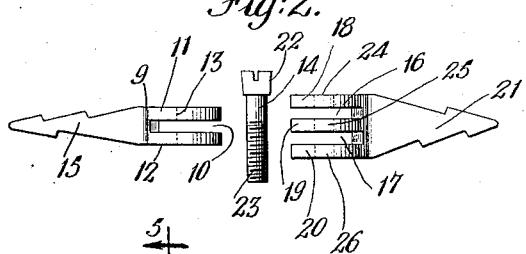
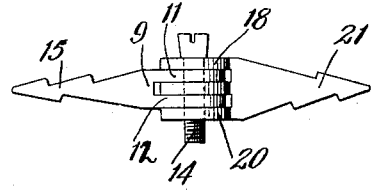
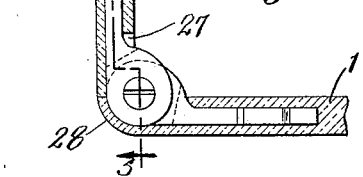
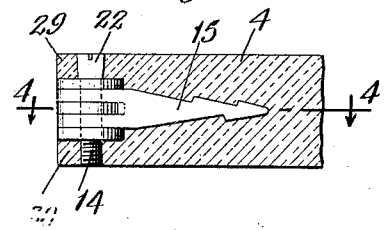
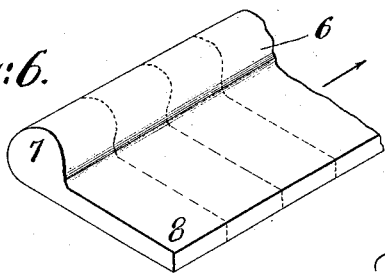

Patented Oct. 28, 1930

1,779,533

UNITED STATES PATENT OFFICE

LOUIS DUNKELSBERG, OF NEW YORK, N. Y.

SPECTACLES

Application filed November 20, 1924. Serial No. 750,982.

This invention relates to the manufacture of spectacles and particularly to the securing of the temple to the frame. It is especially adapted for use in connection with frames and temples of celluloid, zylonite, etc., but may have other applications.

It is necessary that, in order to be practicable the temples and frames, and the manner of securing them together must be sightly and not too cumbersome. For the reasons indicated, as well as others, the size of the parts is limited so that while in other devices the accomplishment of desired objects similar to those sought in connection with spectacle construction, may be attained with comparative ease, the attaining of the desired objects in spectacle construction involves the solving of problems and overcoming of difficulties which do not occur in connection with the other applications referred to.

In securing temples to frames of spectacles one of the most desirable conditions is that the hinges shall not become loose but that the temples shall remain in firm and definite relationship to the frame so that the lenses may be held securely in position, and it is also desired that the hinge members shall be capable of such cooperation that they will grip each other to the extent that the temples will remain in any desired angular relation to the frame. This latter provision enables the spectacles to be laid upon a table with the temples projecting upwardly and held at right angles to the frame or any other desired angular relation thereto, instead of falling down into folded position, whereby they are always in any desired position of adjustment to quickly facilitate their application to the wearer.

It may be said to be the main object of the invention to provide a construction whereby the temples are hinged to the frame in such manner that the parts may be held firmly together so that the spectacles will not become loose in the hinges and the temples will remain at any desired position of adjustment with relation to the frame, and this within such restricted compass that the spectacles may be sightly and suitably light in weight. Where the hinges are each provided with a plurality of barrels, the bearing surface of one hinge member on the other is greatly increased so that the wear is reduced and looseness thereby prevented, the attainment of this latter condition also being facilitated by the fact that the enlarged bearing surfaces between the hinges lessen the development of pressure at any one point of the surface between hinge members under the action of any force tending to distort the hinge members, so that the hinges are stronger to resist this distorting force. Hinge members, as previously manufactured, however, if provided with a plurality of barrels on each hinge member would extend far outside the limits of size permissible in spectacle manufacture and would render the article so heavy and cumbersome as to be prohibited in practice.

I have, however, devised an improved construction of spectacle hinge whereby the advantages as referred to may be realized without entailing the disadvantages noted.

Other and ancillary objects of the invention will appear hereinafter.

In the accompanying drawings which illustrate the invention—

Fig. 1 is a perspective view of spectacles embodying the invention;

Fig. 2 is an exploded view on an enlarged scale showing in side elevation the parts of a hinge;

Fig. 3 is a side elevation showing a hinge assembled of the parts as shown in Fig. 2;

Fig. 4 is a top plan view of the assembled hinge showing its application to a temple and spectacle frame, the parts of the temple and frame being shown in section, parts of the spectacle and frame being broken away, and this figure being a section on the line 4—4 of Fig. 5;

Fig. 5 is a section on the line 5—5 of Fig. 4, the section shown being of the temple, the frame being removed; and Fig. 6 is a perspective view of a bar, partly broken away, from which the hinge members are formed.

Referring to the drawings, the apparatus comprises a frame 1 of zylonite having the openings 2 and 3 for the lenses as is usual, and to this frame are hinged the temples 4 and 5 also of zylonite.

The hinges whereby the temples are secured to the frame and their manner of attachment are identical so that a description of one will suffice for both.

The hinges are formed from a bar or blank 6 of drawn steel having the rounded thickened portion 7 along one side and the flat plate-like portion 8 from which the shanks are formed. The drawing of the bar takes place in the direction of the arrow so that the grain of the metal is transverse to the shanks and parallel to the axis of the barrel portion.

In forming the hinges, blanks are cut from the bar 6 as indicated by dotted lines in Fig. 6, of a width corresponding to that of the desired hinge part. These blanks, as can be readily seen, are formed with the grain of the metal extending in the direction which is axial of the barrels which may be made therefrom. One of the blanks thus obtained is formed into the hinged part 9 by milling the slot 10 to form the two barrel portions 11 and 12 through both of which is drilled the hole 13 for receiving the pivot pin 14. The shank 15 is formed in any suitable manner, as by punching, with the jagged edges as shown so that it may more securely grip the zylonite in which it is embedded. The other hinge part is formed from a similar, but wider, blank by milling into it the slots 16 and 17 whereby the three barrels 18, 19 and 20 are formed, the shank portion 21 being punched or otherwise formed as mentioned in connection with the shank portion 15 of the other hinged part. It will be observed that the barrel portions of each hinge part are offset from the shank. The pivot pin 14 is provided with a head 22 having a slot for the reception of a screw driver and its lower portion 23 is threaded. Openings 24, 25 and 26 are formed in the barrels for the reception of the pivot pin 14, the lower opening 26 only being threaded to cooperate with the threads 23 on the pivot pin. The assembly of the hinged parts is shown in Fig. 3 and the barrels there sandwiched together may be drawn tightly together by turning the pin by means of a screw driver, the head 22 bearing upon the top of the barrel 18 while the threads 23 engage in the lowest barrel.

The temple 4 and frame 1 are provided respectively with recesses 27 and 28 for the reception of the hinged barrels and the hinged parts are secured to the temple and frame respectively by having the shanks 15 and 21 embedded in them either by pressing them into the zylonite while it is softened by heat or in other ways well known in the art. The assembly of the parts of the hinge together may be accomplished either before or after they are secured to the temple and frame.

It will be observed by reference to Fig. 4 that when the temple is at right angles to the frame the hinge is entirely covered with zylonite on the outside and it will also be seen that ears 29 and 30 extending from the temple cover the top and bottom ends of the barrels so that there is only exposed to view the top and bottom ends of the screw pin. Easy access to the head is thus afforded to adjust the hinge as before referred to.

By the manufacture of the hinges as shown a hinge with a plurality of barrels on each part may be produced within the necessary limits of width which was not before feasible. By reason of this increase in the number of barrels the bearing surface of the hinged parts is greatly increased whereby the pressure upon any portion of the bearing surface for a given aggregate force upon the hinge parts, is decreased. The parts are accurately fitted together so that the bearing surface is the same at all angular positions of the temple with relation to the frame so that the hinge parts are held in firm relationship and the temples are held firmly in any desired position of angular relationship with relation to the frame.

While the invention has been illustrated in what is considered its best application it may have other embodiments without departing from its spirit and is not, therefore, limited to the structures shown in the drawings.

What I claim is:

1. In spectacles, the combination with a frame of a temple, a hinge member having a flat shank with lateral teeth embedded in said frame and a plurality of barrels, a cooperating hinge member having a flat shank of the same sectional configuration with lateral teeth embedded in said temple and a plurality of barrels, said barrels being sandwiched with each other, a pivot pin passing through said temple and barrels, said shanks being entirely embedded in and interlocking with the frame and temple, respectively, and said hinge members being composed of material having the grain of the metal extending axially of the barrels.

2. In spectacles the combination with frame and temple members, of a hinge portion having a shank embedded in said frame member and a plurality of barrels, a cooperating hinge portion having a shank embedded in said temple member and a plurality of barrels and a pivot pin passing through said barrels, the said barrels being offset from their respective shanks, said members having recesses in which the barrels of said hinge members respectively are mounted, the material of one of said members extending over the ends of said barrels, having a hole for access to the pivot pin and said hinge members being composed of material having the grain of the metal extending axially of the barrels.

3. In spectacles the combination with frame and temple members, of a hinge portion having a shank embedded in said frame member and a plurality of barrels, a cooperating hinge portion having a shank embedded in said temple member and a plurality of barrels and a pivot pin passing through said barrels, the said barrels being offset from their respective shanks, said members having recesses in which the barrels of said hinge members respectively are mounted, the material of the temple extending over the ends of said barrels, having a hole for access to the pivot pin and said hinge members being composed of material having the grain of the metal extending axially of the barrels.

4. In spectacles, the combination with a frame having lateral projections to which the temples are secured, temples hinged to said frame and hinging means for securing said temples to said frame, the hinging means for each temple comprising two hinge parts each comprising a jagged shank portion and a plurality of barrels offset from said shank portion, said shank portions being embedded in said frame projection and said temple and interlocking therewith to secure the hinge parts to the projection and temple respectively, the longitudinal axes of the shanks of a hinging means extending longitudinally of the temple and of the frame projection respectively, recesses in each projection and its cooperating temple for receiving the hinge barrels, the material of the temple and projection covering the hinge barrels from outside view when the temples are in position to place the spectacles on the wearer, a pivot pin extending through the barrels of a hinge, the material of one of the hinged parts extending over the ends of the barrels of the hinge, having a hole for access to the pivot pin, and said hinge members being composed of material having the grain of the metal extending axially of the barrels.

In testimony whereof I have signed this specification this 18th day of November, 1924.

LOUIS DUNKELSBERG.